US011232379B2

(12) United States Patent
Rossmark et al.

(10) Patent No.: US 11,232,379 B2
(45) Date of Patent: *Jan. 25, 2022

(54) RETAIL DEPLOYMENT MODEL

(71) Applicant: Allstate Insurance Company, Northbrook, IL (US)

(72) Inventors: Sharon Rossmark, Northbrook, IL (US); Larry Kobori, Newark, CA (US); Gary Kerr, Woodside, CA (US)

(73) Assignee: Allstate Insurance Company, Northbrook, IL (US)

( * ) Notice: Subject to any disclaimer, the term of this patent is extended or adjusted under 35 U.S.C. 154(b) by 469 days.

This patent is subject to a terminal disclaimer.

(21) Appl. No.: 14/558,375

(22) Filed: Dec. 2, 2014

(65) Prior Publication Data

US 2015/0088566 A1 Mar. 26, 2015

Related U.S. Application Data

(63) Continuation of application No. 11/461,512, filed on Aug. 1, 2006, now Pat. No. 8,938,432.

(60) Provisional application No. 60/743,295, filed on Feb. 15, 2006.

(51) Int. Cl.
*G06Q 10/06* (2012.01)
*G06Q 10/00* (2012.01)

(52) U.S. Cl.
CPC ......... *G06Q 10/0631* (2013.01); *G06Q 10/00* (2013.01); *G06Q 10/067* (2013.01)

(58) Field of Classification Search
CPC . G06F 17/30241; G06F 16/29; G06F 16/9537
See application file for complete search history.

(56) References Cited

U.S. PATENT DOCUMENTS

| 5,490,097 | A | 2/1996 | Swenson et al. |
| 6,681,985 | B1 | 1/2004 | Curtin et al. |
| 7,130,865 | B2 | 10/2006 | Moore |
| 7,353,183 | B1 | 4/2008 | Musso |
| 7,412,398 | B1 * | 8/2008 | Bailey ........................ 705/7.31 |
| 7,447,685 | B2 | 11/2008 | Nye |
| 7,496,886 | B2 | 2/2009 | Puttaswamy et al. |
| 7,822,751 | B2 | 10/2010 | O'Clair et al. |
| 7,877,286 | B1 * | 1/2011 | Neal ................... G06Q 20/201 705/20 |
| 7,933,929 | B1 | 4/2011 | McClendon et al. |

(Continued)

FOREIGN PATENT DOCUMENTS

WO 2004/059420 A2 7/2004

OTHER PUBLICATIONS

Feb. 4, 2016—U.S. Non Final Office Action—U.S. Appl. No. 13/184,173.

(Continued)

*Primary Examiner* — Mohammad S Rostami
(74) *Attorney, Agent, or Firm* — Polsinelli PC (57) ABSTRACT

A method of determining and optimizing the location of a new insurance agency is disclosed to increase market penetration of underrepresented markets. The method comprises the use of a scoring algorithm to rank various geographic regions or related zip codes. The scoring algorithm may be implemented by a location modeling system based on variables selected by a user.

20 Claims, 10 Drawing Sheets

(56) References Cited

U.S. PATENT DOCUMENTS

| | | | |
|---|---|---|---|
| 8,010,404 B1* | 8/2011 | Wu | G06Q 30/02 705/1.1 |
| 3,041,648 A1 | 10/2011 | Rossmark et al. | |
| 8,219,535 B1 | 7/2012 | Kobori et al. | |
| 8,655,595 B1* | 2/2014 | Green | G06Q 90/00 702/5 |
| 8,805,805 B1 | 8/2014 | Kobori et al. | |
| 8,880,611 B1* | 11/2014 | Lim | H04L 51/12 709/204 |
| 8,938,432 B2 | 1/2015 | Rossmark et al. | |
| 9,483,767 B2 | 11/2016 | Rossmark et al. | |
| 2002/0010667 A1* | 1/2002 | Kant | G06F 8/10 705/35 |
| 2002/0062346 A1 | 5/2002 | Chen | |
| 2002/0069090 A1 | 6/2002 | De Grosz et al. | |
| 2002/0076085 A1 | 6/2002 | Shimazu | |
| 2002/0077842 A1 | 6/2002 | Charisius et al. | |
| 2002/0083024 A1 | 6/2002 | Myers | |
| 2002/0147613 A1 | 10/2002 | Kennard et al. | |
| 2002/0161609 A1 | 10/2002 | Zizzamia et al. | |
| 2002/0169622 A1 | 11/2002 | Estridge | |
| 2002/0188480 A1 | 12/2002 | Liebeskind et al. | |
| 2002/0194033 A1 | 12/2002 | Huff | |
| 2002/0198755 A1 | 12/2002 | Birkner et al. | |
| 2002/0198760 A1 | 12/2002 | Carpenter et al. | |
| 2003/0033195 A1 | 2/2003 | Bruce et al. | |
| 2003/0088562 A1 | 5/2003 | Dillon et al. | |
| 2003/0125990 A1 | 7/2003 | Rudy et al. | |
| 2003/0177072 A1 | 9/2003 | Bared | |
| 2003/0187740 A1 | 10/2003 | Tanahashi et al. | |
| 2003/0208401 A1* | 11/2003 | Karsten | G06Q 30/02 705/14.7 |
| 2003/0212621 A1 | 11/2003 | Poulter et al. | |
| 2004/0044549 A1 | 3/2004 | Loop | |
| 2004/0110515 A1 | 6/2004 | Blumberg et al. | |
| 2004/0117358 A1 | 6/2004 | von Kaenel et al. | |
| 2004/0117361 A1 | 6/2004 | Greer et al. | |
| 2004/0138953 A1 | 7/2004 | Van Luchene et al. | |
| 2004/0153346 A1 | 8/2004 | Grundel et al. | |
| 2004/0162752 A1 | 8/2004 | Dean et al. | |
| 2004/0177029 A1 | 9/2004 | Hammour et al. | |
| 2004/0186755 A1 | 9/2004 | Roche | |
| 2004/0186797 A1 | 9/2004 | Schwind et al. | |
| 2004/0193611 A1 | 9/2004 | Raghunandhan | |
| 2004/0230467 A9 | 11/2004 | Gailey et al. | |
| 2004/0267743 A1* | 12/2004 | Dasari et al. | 707/6 |
| 2005/0043971 A1 | 2/2005 | Hendrickson et al. | |
| 2005/0071203 A1 | 3/2005 | Maus | |
| 2005/0071247 A1 | 3/2005 | Kelley et al. | |
| 2005/0076013 A1 | 4/2005 | Hilbert et al. | |
| 2005/0080716 A1 | 4/2005 | Belyi et al. | |
| 2005/0096971 A1 | 5/2005 | Baechtiger | |
| 2005/0096972 A1* | 5/2005 | Baechtiger | 705/11 |
| 2005/0136838 A1 | 6/2005 | Kim et al. | |
| 2005/0149438 A1 | 7/2005 | Williams | |
| 2005/0187868 A1 | 8/2005 | Aspelin et al. | |
| 2005/0198354 A1 | 9/2005 | Holloway | |
| 2005/0222924 A1 | 10/2005 | Sumino et al. | |
| 2005/0240512 A1 | 10/2005 | Quintero et al. | |
| 2005/0262062 A1 | 11/2005 | Xia | |
| 2005/0278313 A1 | 12/2005 | Plow et al. | |
| 2005/0283503 A1 | 12/2005 | Hancock et al. | |
| 2005/0288958 A1 | 12/2005 | Eraker et al. | |
| 2006/0005147 A1 | 1/2006 | Hammack et al. | |
| 2006/0036524 A1 | 2/2006 | Capanna | |
| 2006/0064330 A1 | 3/2006 | Sumino et al. | |
| 2006/0085392 A1 | 4/2006 | Wang et al. | |
| 2006/0100912 A1 | 5/2006 | Kumar et al. | |
| 2006/0116905 A1 | 6/2006 | Yered | |
| 2006/0136273 A1 | 6/2006 | Zizzamia et al. | |
| 2006/0155627 A1 | 7/2006 | Horowitz | |
| 2006/0174302 A1 | 8/2006 | Mattern et al. | |
| 2006/0195365 A1 | 8/2006 | Karabetsos | |
| 2006/0206362 A1 | 9/2006 | Rudy et al. | |
| 2006/0206438 A1 | 9/2006 | Sakaue et al. | |
| 2006/0235724 A1 | 10/2006 | Rosenthal | |
| 2006/0242024 A1 | 10/2006 | Mattingly et al. | |
| 2006/0253316 A1 | 11/2006 | Blackshaw et al. | |
| 2006/0253345 A1 | 11/2006 | Heber | |
| 2006/0271531 A1 | 11/2006 | O'Clair et al. | |
| 2006/0273884 A1 | 12/2006 | Watkins et al. | |
| 2006/0282286 A1 | 12/2006 | Faris et al. | |
| 2006/0287896 A1* | 12/2006 | McComb | G06Q 10/10 705/4 |
| 2007/0016542 A1* | 1/2007 | Rosauer | G06N 5/022 706/21 |
| 2007/0027727 A1 | 2/2007 | Cochrane | |
| 2007/0073610 A1 | 3/2007 | Marugabandhu et al. | |
| 2007/0094038 A1 | 4/2007 | Kling et al. | |
| 2007/0100724 A1* | 5/2007 | Hollas et al. | 705/36 R |
| 2007/0112622 A1 | 5/2007 | Meggs | |
| 2007/0112791 A1 | 5/2007 | Harvey et al. | |
| 2007/0130026 A1 | 6/2007 | O'Pray et al. | |
| 2007/0198384 A1* | 8/2007 | Prouty | 705/35 |
| 2007/0203759 A1 | 8/2007 | Mathai et al. | |
| 2007/0295560 A1 | 12/2007 | Heckel et al. | |
| 2008/0086356 A1* | 4/2008 | Glassman et al. | 705/10 |
| 2015/0088566 A1 | 3/2015 | Rossmark et al. | |

OTHER PUBLICATIONS

Mar. 11, 2016—U.S. Final Office Action—U.S. Appl. No. 14/341,276.
Mar. 19, 2013—U.S. Office Action—U.S. Appl. No. 13/517,878.
Sherman, A.J., Franchising & Licensing: Two Powerful Ways to Grow Your Business in Any Economy, 3rd Edition, AMACOM, 2004, 10 pp.
http://www.batchgeocode.com/, pp. 1-4, Apr. 7, 2008, Map Multiple Locations/Find Address Coordinates, © 2007 Phillip Homstrand.
http://map-suite-geocode-usa.thinkgeo-llc.qarchive.org/, pp. 1-2, Apr. 7, 2008, Map Suite Geocode USA 1.0.
http://www.fema.gov/plan/prevent/fhm/dl_mhip.shtm, pp. 1-5, Apr. 7, 2008, Multi-Year Flood Hazard Identification Plan (MHIP).
http://www.navteq.com/about/database_about.html, p. 1, Apr. 7, 2008, Our Flagship Offering, © 2008 NAVTEQ.
http://www.geocode.com, pp. 1-2, Apr. 7, 2008, Tele Atlas Geocoding Services, © 2008 Tele Atlas.
http://web.archive.org/web/20051018080503/www.point-x.com/solutions.htm, Solutions Overview, p. 1, Apr. 7, 2008, © 2005 Point-X Corporation.
http://www.point-x.com/AboutPointX.htm, About Point-X, p. 1, Apr. 7, 2008, © 2001, Point-X, 6 Loch Lomond Drive, San Rafael.
http:/web.archive.org/web/20051018081137/www.point-x.com/clients.htm, Clients, pp. 1-2, Apr. 7, 2008, © 2005, Point-X Corporation.
http://web.archive.org/web/20051219103214/www.point-x.com/managementteam.htm, Management Team, pp. 1-2, Apr. 7, 2008, © 2005, Point-X Corporation.
http://web.archive.org/web/20051018080524/www.point-x.com/aboutpointx.htm, About Point-X, p. 1, Apr. 7, 2008, © 2005, Point-X Corporation.
Parry, Chris, "Reducing Locations, Maximizing Profit", pp. 1-2.
http://developer.yahoo.com/maps/rest/V1/geocode.html, pp. 1-3, Apr. 7, 2008, Yahoo! Developer Network, © 2008 Yahoo! Inc.
Mar. 14, 2014—U.S. Office Action—U.S. Appl. No. 13/184,173.
May 28, 2013—(CA) Office Action—App 2,561,198.
Oct. 21, 2013—U.S. Office Action—U.S. Appl. No. 13/184,173.
Apr. 22, 2013—U.S. Office Action—U.S. Appl. No. 13/184,173.
Aug. 14, 2012—U.S. Office Action—U.S. Appl. No. 13/184,173.
Jan. 16, 2012—(CA) Office Action—App 2,561,198.
Oct. 31, 2011—(CA) Office Action—App 2,561,195.
Mar. 14, 2014—U.S. Office Action—U.S. Appl. No. 11/461,512.
Jul. 12, 2013—U.S. Office Action—U.S. Appl. No. 11/461,512.
Aug. 30, 2012—U.S. Office Action—U.S. Appl. No. 11/461,512.
Jan. 29, 2013—U.S. Office Action—U.S. Appl. No. 11/461,512.
Jul. 9, 2014 (CA) Office Action—App 2,561,195.
Feb. 6, 2012—U.S. Final Office Action—U.S. Appl. No. 11/461,512.
Oct. 3, 2012—U.S. Office Action—U.S. Appl. No. 13/517,878.
Sep. 6, 2011—U.S. Office Action—U.S. Appl. No. 11/461,512.
May 5, 2011—U.S. Office Action—U.S. Appl. No. 12/141,746.

(56) References Cited

OTHER PUBLICATIONS

Dec. 5, 2012—U.S. Office Action—U.S. Appl. No. 13/184,173.
Sep. 26, 2011—U.S. Non-Final Office Action—U.S. Appl. No. 12/141,746.
http://point-x.com/, Point-X Location Intelligence, p. 1, Jun. 18, 2008, © 2001, Point-X 6 Loch Lomond Drive, San Raphael.
http://point-x.com/Overview.htm, Technology, p. 1, Apr. 7, 2008, © 2001, Point-X, 6 Loch Lomond Drive, San Raphael.
Jun. 16, 2016—U.S. Office Action—U.S. Appl. No. 14/341,276.
Jun. 15, 2016—U.S. Notice of Allowance—U.S. Appl. No. 13/184,173.
Jul. 22, 2016—(CA) Office Action—App 2,561,198.
Jul. 11, 2016—(CA) Office Action—App 2,561,195.
Sep. 23, 2016—U.S. Notice of Allowance—U.S. Appl. No. 14/341,276.
http://www.geocode.com/index.cfm?module+abouttez, pp. 1-2, Apr. 7, 2008, Tele Atlas Geocoding Services, 2008 Tele Atlas.
Dec. 2, 2016—U.S. Notice of Allowance—U.S. Appl. No. 14/341,276.
Jun. 12, 2013—U.S. Final Office Action—U.S. Appl. No. 13/517,878.
Jun. 19, 2017—Canadian Office Action—App 2,561,198.
Jun. 21, 2017—Canadian Office Action—App 2,561,195.
Oct. 6, 2017—U.S. Non-Final Office Action—U.S. Appl. No. 15/441,503.
Jan. 5, 2015—U.S. Non-Final Office Action—U.S. Appl. No. 14/341,276.
Jul. 7, 2014—U.S. Office Action—U.S. Appl. No. 13/184,173.
Jul. 14, 2014—(CA) Office Action—App 2,561,198.
Jul. 20, 2015—U.S. Final Office Action—U.S. Appl. No. 14/341,276.
Final Office Action dated Mar. 2, 2015 in U.S. Appl. No. 13/184,173.
Nov. 10, 2015—U.S. Non Final Rejection—U.S. Appl. No. 14/341,276.
May 1, 2018—U.S. Final Office Action—U.S. Appl. No. 15/441,503.
Jun. 20, 2018—(CA) Final Action—App 2,561,198.
Jun. 21, 2018—(CA) Final Action—App 2,561,195.
Sep. 7, 2018—U.S. Non-Final Office Action—U.S. Appl. No. 15/441,503.
Nov. 23, 2018—U.S. Notice of Allowance—U.S. Appl. No. 15/266,546.
Feb. 26, 2019—U.S. Final Office Action—U.S. Appl. No. 15/441,503.
Jan. 14, 2021—U.S. Notice of Allowance—U.S. Appl. No. 16/298,263.

\* cited by examiner

|  | # customer | ave. ltv | % < 1yr | % college | # 5yr growth | % 5yr growth |
|---|---|---|---|---|---|---|
| Table 1 Variable Information (counts, percentages, dollars) | | | | | | |
| ZIP | Variable1 | Variable2 | Variable3 | Variable4 | Variable5 | Variable6 |
| Zip001 | 1,408 | $476 | 17.36% | 57.98% | 1,132 | 9.43% |
| Zip002 | 1,776 | $428 | 18.36% | 58.63% | 1,720 | 9.96% |
| Zip003 | 749 | $437 | 12.63% | 47.30% | 258 | 3.89% |
| .. | | | | | | |
| Zip007 | 471 | $838 | 9.53% | 80.40% | 344 | 6.16% |
| Zip009 | 1,007 | $719 | 15.97% | 52.56% | 1,313 | 17.49% |
| Zip011 | 1,308 | $643 | 14.81% | 73.20% | 691 | 3.60% |
| Zip013 | 1,055 | $423 | 15.15% | 51.48% | 595 | 4.72% |
| Zip016 | 0 | $0 | 27.45% | 45.45% | 2 | 3.92% |
| .. | | | | | | |
| .. | | | | | | |
| Zip050 | 2,274 | $429 | 12.87% | 41.03% | 1,470 | 6.62% |
| μ | 490 | $537 | 13.56% | 48.36% | 449 | 8.58% |
| σ | 510 | $176 | 3.93% | 15.90% | 437 | 3.79% |

Table 2 Score per Variable (relative to state variation)

| ZIP | Variable1 | Variable2 | Variable3 | Variable4 | Variable5 | Variable6 |
|---|---|---|---|---|---|---|
| Zip001 | 1.801058 | -0.345223 | 0.967658 | 0.605304 | 1.562065 | 0.223749 |
| Zip002 | 2.523188 | -0.618997 | 1.221729 | 0.645836 | 2.906273 | 0.365377 |
| Zip003 | 0.507894 | -0.570228 | -0.236824 | -0.066459 | -0.435957 | -1.239403 |
| .. | | | | | | |
| Zip007 | -0.037628 | 1.708173 | -1.024020 | 2.015633 | -0.239355 | -0.638320 |
| Zip009 | 1.014171 | 1.035440 | 0.612873 | 0.264248 | 1.975843 | 2.352516 |
| Zip011 | 1.604827 | 0.600572 | 0.317407 | 1.562269 | 0.553910 | -1.315017 |
| Zip013 | 1.108362 | -0.646068 | 0.405634 | 0.196049 | 0.334448 | -1.020036 |
| Zip016 | -0.961877 | -3.051984 | 3.532384 | -0.182725 | -1.021190 | -1.230506 |
| .. | | | | | | |
| Zip050 | 3.500420 | -0.614778 | -0.175686 | -0.460829 | 2.334756 | -0.518736 |

Table 3 Range of Weights Assigned per Variable

| 1 | 2 | 3 | 4 | 5 | 6 |
|---|---|---|---|---|---|
| .10-.2 | .10-.20 | .10-.20 | .10-.25 | .10-.30 | .15-.20 |

Figure 6a

| | Table 4 Weighted Scores (equal weights) | | | | | | |
|---|---|---|---|---|---|---|---|
| ZIP | Variable1 | Variable2 | Variable3 | Variable4 | Variable5 | Variable6 | Composite Score |
| Zip001 | 0.300182 | -0.057538 | 0.161280 | 0.100886 | 0.260349 | 0.037292 | 0.802451 |
| Zip002 | 0.420540 | -0.103168 | 0.203626 | 0.107641 | 0.484388 | 0.060897 | 1.173924 |
| Zip003 | 0.084651 | -0.095040 | -0.039472 | -0.011077 | -0.072661 | -0.206571 | -0.340170 |
| Zip007 | -0.006271 | 0.284701 | -0.170673 | 0.335946 | -0.039893 | -0.106389 | 0.297420 |
| Zip009 | 0.169032 | 0.172577 | 0.102148 | 0.044042 | 0.329314 | 0.392094 | 1.209206 |
| Zip011 | 0.267476 | 0.100097 | 0.052902 | 0.260383 | 0.092320 | -0.219174 | 0.554006 |
| Zip013 | 0.184731 | -0.107680 | 0.067607 | 0.032676 | 0.055742 | -0.170009 | 0.063066 |
| Zip016 | -0.160316 | -0.508674 | 0.588742 | -0.030455 | -0.170202 | -0.205089 | -0.485993 |
| Zip050 | 0.583415 | -0.102465 | -0.029282 | -0.076806 | 0.389134 | -0.086458 | 0.677538 |

| | Table 5 Weighted Scores (varying weights) | | | | | | |
|---|---|---|---|---|---|---|---|
| ZIP | Variable1 | Variable2 | Variable3 | Variable4 | Variable5 | Variable6 | Composite Score |
| Zip001 | 0.225132 | -0.043153 | 0.096766 | 0.121061 | 0.468620 | 0.033562 | 0.90198781 |
| Zip002 | 0.315399 | -0.077375 | 0.122173 | 0.129167 | 0.871882 | 0.054807 | 1.41605224 |
| Zip003 | 0.063487 | -0.071278 | -0.023682 | -0.013292 | -0.130787 | -0.185910 | -0.3614634 |
| Zip007 | -0.004704 | 0.213522 | -0.102402 | 0.403127 | -0.071807 | -0.095748 | 0.34198808 |
| Zip009 | 0.126771 | 0.129430 | 0.061287 | 0.052850 | 0.592753 | 0.352877 | 1.31596875 |
| Zip011 | 0.200603 | 0.075072 | 0.031741 | 0.312454 | 0.166173 | -0.197253 | 0.58878976 |
| Zip013 | 0.138545 | -0.080759 | 0.040563 | 0.039210 | 0.100334 | -0.153005 | 0.08488892 |
| Zip016 | -0.120235 | -0.381498 | 0.353238 | -0.036545 | -0.306357 | -0.184576 | -0.6759721 |
| Zip050 | 0.437552 | -0.076847 | -0.017569 | -0.092166 | 0.700427 | -0.077810 | 0.87358715 |

Figure 6b

Table 1 Composite & Final Score (equal weights) — 690

| ZIP | Composite Score | μ | σ | Final Score | ZipRank |
|---|---|---|---|---|---|
| Zip001 | 0.802451 | 6.42761E-17 | 0.464196 | 1.728691 | 5 |
| Zip002 | 1.173924368 | 6.42761E-17 | 0.464196 | 2.528941 | 2 |
| Zip003 | -0.34016957 | 6.42761E-17 | 0.464196 | -0.732815 | 44 |
| ... | | | | | |
| Zip007 | 0.297419667 | 6.42761E-17 | 0.464196 | 0.64072 | 13 |
| Zip009 | 1.209206133 | 6.42761E-17 | 0.464196 | 2.604948 | 1 |
| Zip011 | 0.554005666 | 6.42761E-17 | 0.464196 | 1.193474 | 9 |
| Zip013 | 0.063066115 | 6.42761E-17 | 0.464196 | 0.135861 | 19 |
| Zip016 | -0.48599269 | 6.42761E-17 | 0.464196 | -1.046956 | 51 |
| ... | | | | | |
| Zip050 | 0.677537972 | 6.42761E-17 | 0.464196 | 1.459595 | 6 |

Table 2 Composite & Final Score (varying weights)

| ZIP | Composite Score | μ | σ | Final Score | ZipRank |
|---|---|---|---|---|---|
| Zip001 | 0.901987809 | 6.42761E-17 | 0.5421449 | 1.663739 | 5 |
| Zip002 | 1.416052242 | 6.42761E-17 | 0.5421449 | 2.611944 | 1 |
| Zip003 | -0.36146344 | 6.42761E-17 | 0.5421449 | -0.666729 | 43 |
| ... | | | | | |
| Zip007 | 0.341988081 | 6.42761E-17 | 0.5421449 | 0.630806 | 13 |
| Zip009 | 1.315968747 | 6.42761E-17 | 0.5421449 | 2.427338 | 2 |
| Zip011 | 0.588789762 | 6.42761E-17 | 0.5421449 | 1.086038 | 10 |
| Zip013 | 0.084888917 | 6.42761E-17 | 0.5421449 | 0.15658 | 20 |
| Zip016 | -0.67597207 | 6.42761E-17 | 0.5421449 | -1.246848 | 54 |
| ... | | | | | |
| Zip050 | 0.873587152 | 6.42761E-17 | 0.5421449 | 1.611354 | 6 |

Figure 7

| ZIP ▲▼ | Households (2003) ▲●▼ | 5-Year HH Change ▲●▼ | % HH Current Residence <1 Year ▲●▼ | % College Education ▲●▼ | Allstate Opportunity Index ▲●▼ | CA ▲●▼ | IA ▲●▼ | Total Competitive Agents ▲●▼ | % Allstate HH Penetration ▲●▼ | Allstate Customer Households ▲●▼ | Prospects ▲●▼ |
|---|---|---|---|---|---|---|---|---|---|---|---|
| ZIP 1 | 2,001 | 2,045 | 34.78% | 91.45% | 6.93 | 0 | 0 | 0 | 2.75% | 55 | 1,946 |
| ZIP 2 | 5,003 | 2,230 | 17.45% | 55.47% | 5.80 | 0 | 1 | 4 | 8.06% | 403 | 4,600 |
| ZIP 3 | 6,577 | 2,319 | 6.51% | 61.66% | 5.18 | 0 | 0 | 8 | 13.99% | 920 | 5,657 |
| ZIP . | 29,650 | 8,776 | 31.92% | 82.13% | 5.14 | 1 | 0 | 18 | 10.77% | 3,193 | 26,457 |
| ZIP . | 14,082 | 3,556 | 20.30% | 69.80% | 5.02 | 1 | 0 | 30 | 12.04% | 1,696 | 12,386 |
| ZIP . | 25,134 | 2,656 | 24.47% | 76.86% | 5.00 | 1 | 0 | 32 | 9.15% | 2,299 | 22,835 |
| ZIP . | 16,182 | 4,032 | 20.42% | 55.61% | 4.95 | 1 | 0 | 18 | 8.79% | 1,422 | 14,760 |
| ZIP . | 7,598 | 2,438 | 21.05% | 76.22% | 4.83 | 0 | 1 | 10 | 12.46% | 947 | 6,651 |
| ZIP . | 10,139 | 2,653 | 16.96% | 83.66% | 4.71 | 1 | 1 | 29 | 11.19% | 1,135 | 9,004 |
| ZIP . | 20,563 | 3,247 | 17.55% | 59.61% | 4.58 | 1 | 0 | 36 | 12.02% | 2,471 | 18,092 |
| ZIP . | 20,157 | 4,836 | 27.73% | 88.04% | 4.33 | 1 | 0 | 43 | 13.80% | 2,781 | 17,376 |
| ZIP . | 5,488 | 1,843 | 26.59% | 79.00% | 4.32 | 0 | 0 | 6 | 12.04% | 661 | 4,827 |
| ZIP . | 23,972 | 4,558 | 14.15% | 51.62% | 3.98 | 1 | 0 | 58 | 10.21% | 2,448 | 21,524 |
| ZIP . | 22,851 | 7,086 | 31.34% | 57.71% | 3.85 | 1 | 0 | 38 | 9.42% | 2,153 | 20,698 |
| ZIP . | 26,856 | 3,817 | 24.70% | 86.52% | 3.75 | 1 | 0 | 22 | 8.71% | 2,339 | 24,517 |
| ZIP n | 20,564 | 4,869 | 18.84% | 81.59% | 3.65 | 1 | 0 | 30 | 14.62% | 3,007 | 17,557 |

Figure 8

Figure 9

RETAIL DEPLOYMENT MODEL

CROSS REFERENCE TO RELATED APPLICATIONS

This application is a continuation of U.S. application Ser. No. 11/461,512, filed Aug. 1, 2006, which claims the benefit of U.S. Provisional Application No. 60/743,295, filed Feb. 15, 2006. The present application claims priority to and the benefit of all the above-identified applications, and all the above-identified applications are incorporated by reference herein in their entireties.

FIELD OF THE INVENTION

The present invention relates to business location modeling systems and methods. More particularly, the invention relates to insurance agency location modeling to establish new insurance agency locations in various geographic locations based on an evaluation of user selected criteria.

DESCRIPTION OF THE RELATED ART

The decision to open a new office or branch in order to increase sales for various different types of products or services in a particular geographical region or postal zip code can involve consideration of numerous factors such as population density, potential population growth, customer household data, and traffic flow patterns. When determining a location for a new office or branch for an insurance company, a business entity or business owner may desire to consistently use the same factors or analysis when comparing different geographical locations for the new office site. The use of inconsistent data or factors across geographic locations may result in a suboptimal site location being selected for a new office or branch.

Moreover, as the number of potential geographic regions increases, it can be desirable to normalize results so that comparisons between the different geographic regions may be utilized. For example, a company providing a particular product or service may wish to open a number of new offices or branches across a large geographic region such as the United States. With such a large geographic region to consider, it can be desirable to display comparable results to decision makers so that suitable site locations may be selected.

Current site location models in use in other industries such as retail pharmacy do not take into account unique factors and problems found in the insurance industry. In addition, existing site location models or systems of other industries may not utilize an overall scoring method that allows results to be consistently and easily displayed to the decision maker or business entity. Without an overall scoring methodology, the analysis of the results is more time consuming and inefficient involving the unnecessary consumption of numerous resources.

Therefore, there is a need in the art for an insurance agency location modeling method and system regarding the process of determining successful placement of future insurance agency locations. The method and system for suitable insurance agency locations must provide consistent and easily interpreted results.

SUMMARY

Aspects of the present invention overcome problems and limitations of the prior art by providing a method of determining suitable locations for new insurance agency locations. The disclosed method may be utilized to increase market penetration of underrepresented markets. The method comprises the use of a scoring algorithm to rank various geographical regions by related zip codes. The scoring algorithm may be implemented by a location modeling system based upon markets selected by a user.

In an exemplary aspect of the invention, a user may select a geographical region to be evaluated for placement of an insurance agency location. The geographical region may be in the form of a postal zip code. Various modeling factors are used to determine a highly suitable location for the new insurance agency. A score for each zip code is calculated with the highest overall score representing the most highly suitable, preferred or optimized location for the new office or branch.

In certain embodiments of the invention, the present invention can be partially or wholly implemented with a computer-readable medium, for example, by storing computer-executable instructions or modules, or by utilizing computer-readable data structures. Of course, the methods and systems of the above-referenced embodiments may also include other additional elements, steps, computer-executable instructions, or computer-readable data structures.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein:

FIGS. 6a, 6b, and 7 illustrate the calculation of a final score for selected zip codes, in accordance with an aspect of the invention.

DETAILED DESCRIPTION

Exemplary Operating Environment

Figure 1:
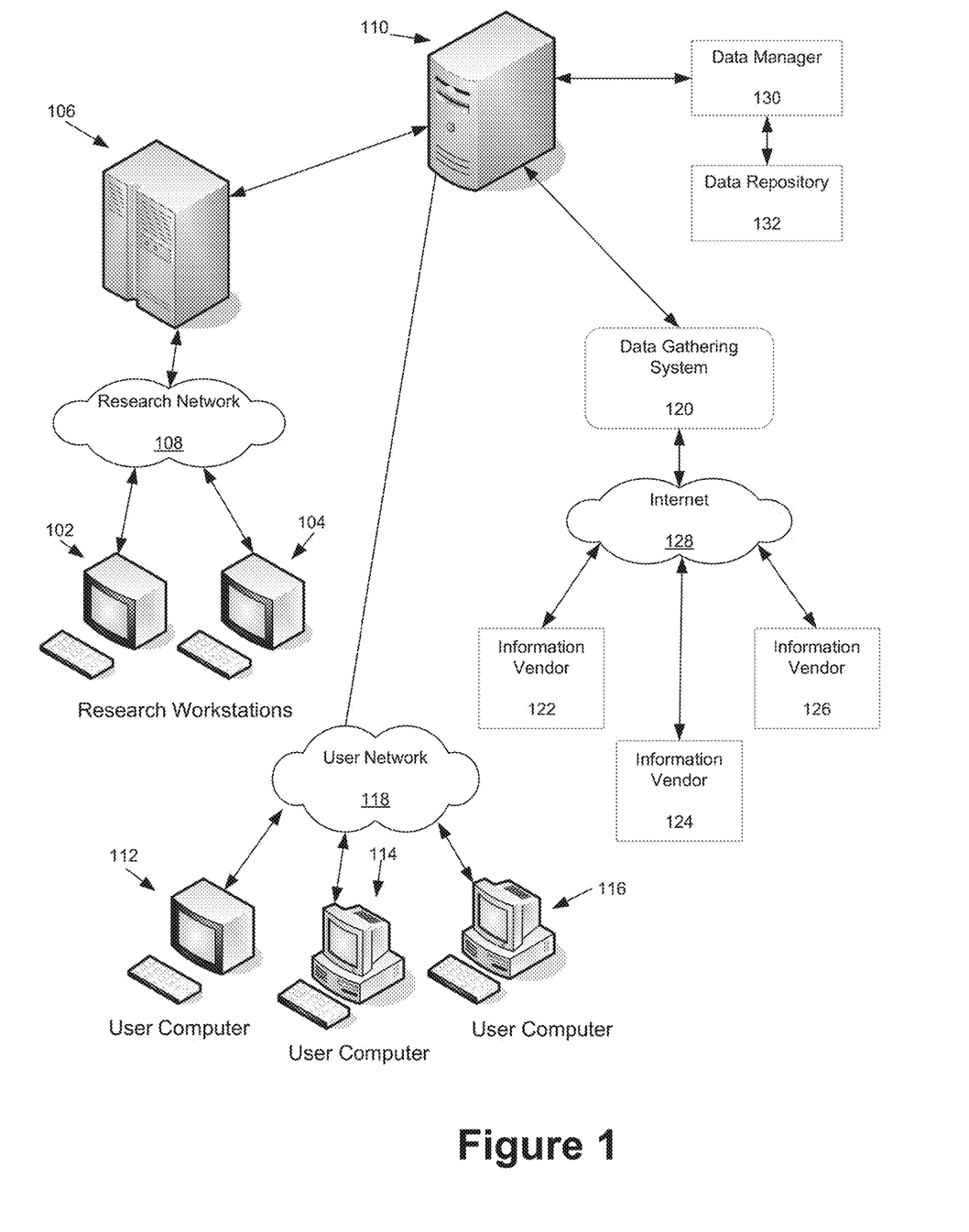
FIG. 1 shows a diagram of a computer system that may be used to implement aspects of the invention.

FIG. 1 shows a diagram of a computer system that may be used to implement aspects of the invention. A plurality of computers, such as research workstations 102 and 104, may be coupled to a user computer 112 via networks 108 and 118.

User computer 112 may be coupled to a data solutions transaction manager computer 110, which is described in detail below. User computer 112 provides decision makers with a user interface on user workstations 112, 114 and 116 for displaying policy information and decisions such as potential new agency locations, and enables users to interact with data solutions transaction manager computer 110.

User workstations 112, 114 and 116 and research workstations 102 and 104 may require information from external data sources to assist evaluation of a potential new agency location. Requests for such information may be transmitted via data solutions transaction manager computer 110 to a data gathering system 120. Data gathering system 120 may include a processor, memory and other conventional computer components and may be programmed with computer-executable instructions to communicate with other computer devices. Data gathering system 120 may access external sources of information, such as information vendors 122, 124 and 126 via the Internet 128. Information vendors may include federal or state agencies that provide aggregate motor vehicle data, census information, or vendors that provide demographic information, maps and geographical location information, and other information that may be used to evaluate potential agency locations.

Data solutions transaction manager 110 may be programmed with computer-executable instructions to receive requests for data from user computers 112, 114 and 116 and research workstations 102 and 104, format the requests and transmit the requests to data gathering system 120. In one embodiment of the invention, requests for data are in the form of documents that are in extensible markup language (XML) format. Data solutions transaction manager 110 may also be coupled to a data manager computer device 130 that accesses customer data stored in a data repository 132. In one embodiment of the invention, all data gathered on a customer or potential customer is stored in data repository 132 so that when additional requests are made for the same data, the data may quickly be obtained without requesting it from information vendors 122, 124 and 126. Data repository 132 may be implemented with a group of networked server computers or other storage devices.

Decision makers may be provided with a user interface on user computers 112, 114 and 116 for displaying policy information and decisions, and enables users to interact with data solutions transaction manager 110. The user interface may allow a user or decision maker to perform a variety of functions, such as entering local market data into analysis report templates, and displaying decision results. In addition, users may execute various analysis tools to answer questions such as: 1) "Where is the best location for a new office?", 2) "What is the makeup of the population?", 3) "Where are our competitors' offices?", 4) "Which markets will experience household and vehicle growth?", and 5) "Are there enough prospects that own homes in a three mile radius around a particular agent's office?"

In an embodiment, senior decision makers may use the system to improve their understanding of the marketplace, facilitating business decisions. The user may select various geographic regions and run various reports to obtain agency deployment information.

One or more of the computer devices and terminals shown in FIG. 1 may include a variety of interface units and drives for reading and writing data or files. One skilled in the art will appreciate that networks 108, 118 and 128 are for illustration purposes and may be replaced with fewer or additional computer networks. One or more networks may be in the form of a local area network (LAN) that has one or more of the well-known LAN topologies and may use a variety of different protocols, such as Ethernet. One or more of the networks may be in the form of a wide area network (WAN), such as the Internet. Computer devices and other devices may be connected to one or more of the networks via twisted pair wires, coaxial cable, fiber optics, radio waves or other media.

The term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" but also a "content network," which is comprised of the data—attributable to a single entity—which resides across all physical networks.

Exemplary Embodiments

Figure 2:
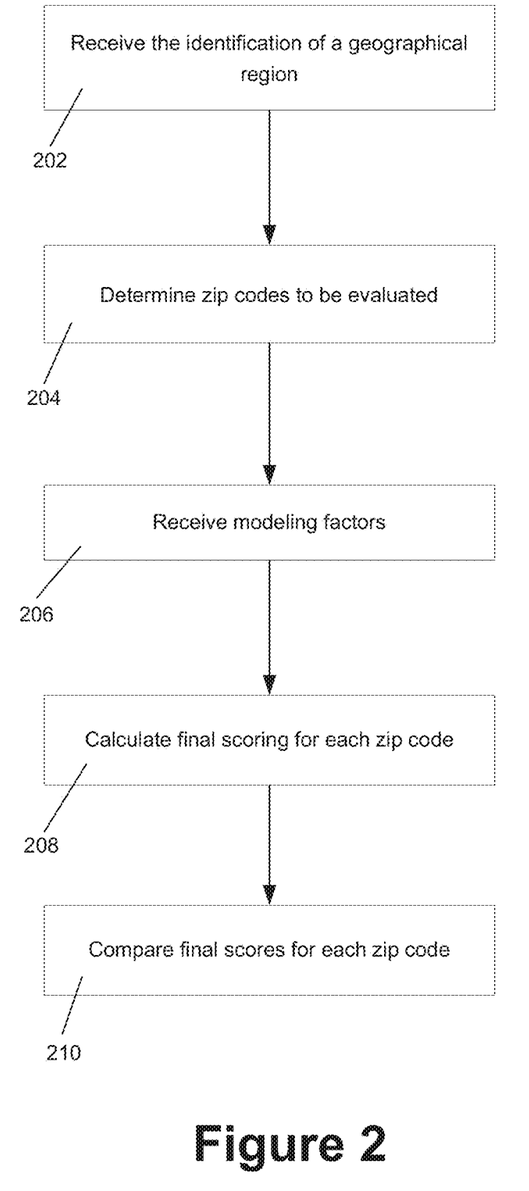
FIG. 2 illustrates a method of application of the insurance agency location modeling system, in accordance with an embodiment of the invention.
Figure 3:
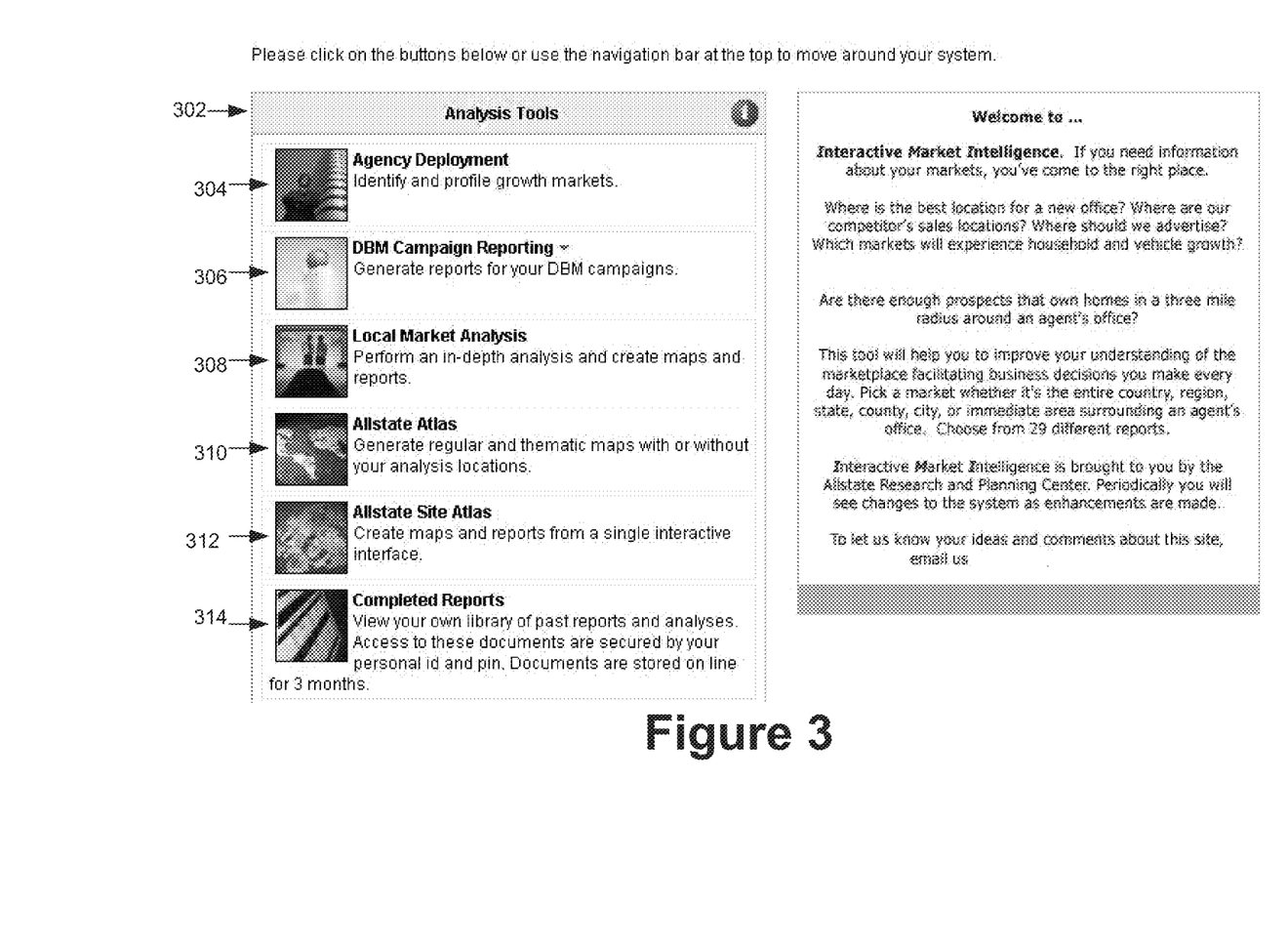
FIG. 3 illustrates an exemplary user interface screen for a section of the agency deployment modeling system, in accordance with an aspect of the invention.

FIG. 2 illustrates a method of determining a suitable location of an insurance agency location in an embodiment of the invention. The method may be implemented by a location modeling system being executed on a computer such as data solutions transaction manager 110. The method of FIG. 2 will be illustrated in the following exemplary embodiment. FIG. 3 illustrates a user interface screen 302 that may be presented to a user by the data solutions transaction manger 110. The user interface screen 302 may enable a user to execute a number of different analysis tools such as agency deployment tool 304, a report generation tool 306, a local market analysis tool 308, atlas tools 310 and 312, and/or a library of generated reports tool 314. A user may execute the agency deployment tool 304 by clicking on the agency deployment box.

Figure 4:
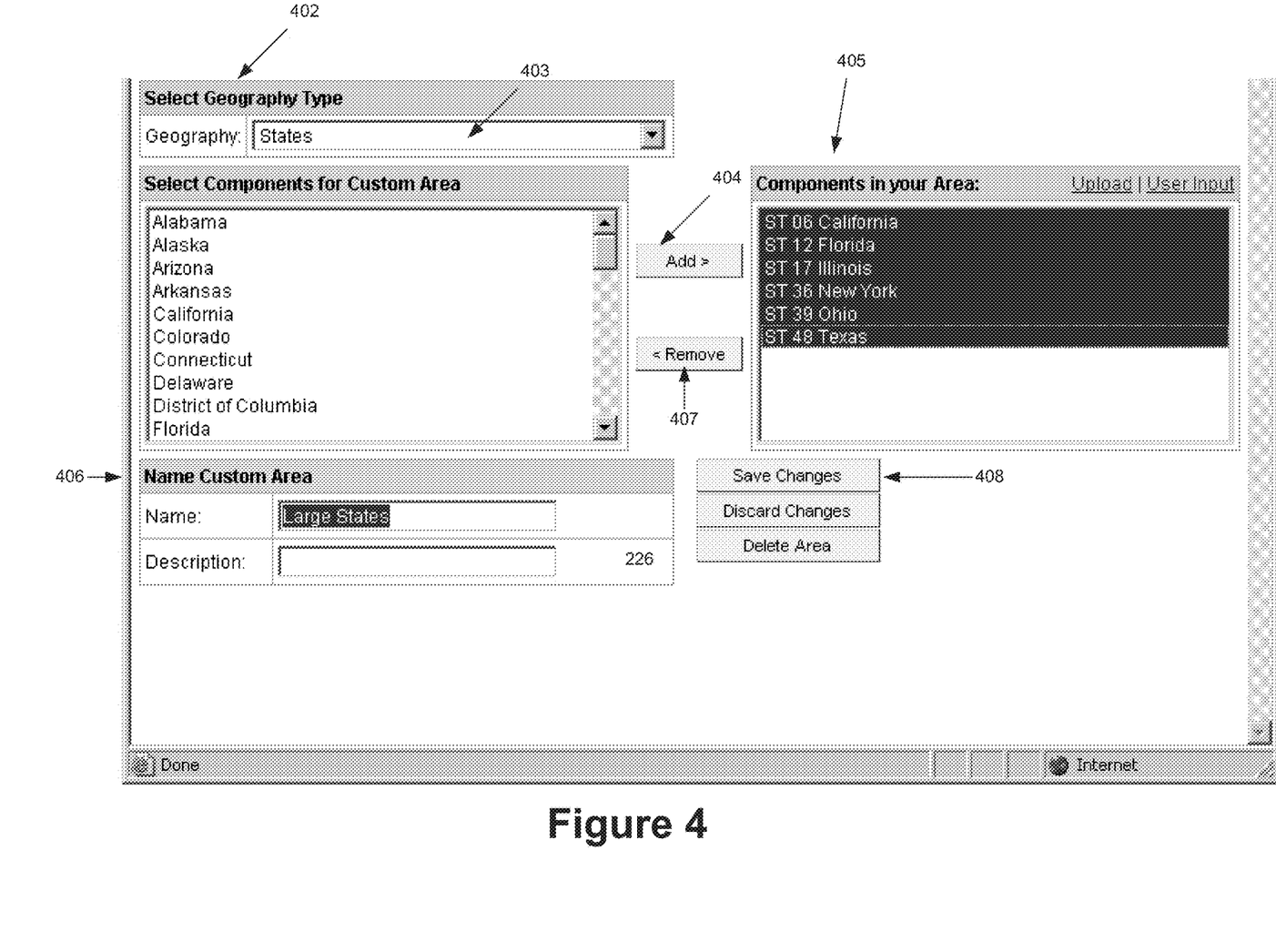
FIG. 4 illustrates an exemplary user interface screen enabling a user to select various geographic regions, in accordance with an aspect of the invention.

Upon activation of the agency deployment tool 304, in a first step 202, a user selects at least one geographic region to be evaluated for placement of a new insurance agency location. The geographic region may be a region of the United States such as the Midwest or may be a combination of various different states, cities, towns, neighborhoods, or other geographic identifiable regions. Those skilled in the art will realize that numerous different geographic regions and combinations may be defined for analysis. For instance, FIG. 4 illustrates a user interface screen 402 that enables a user to select various U.S. States for analysis based on selection box 403.

Figure 5:
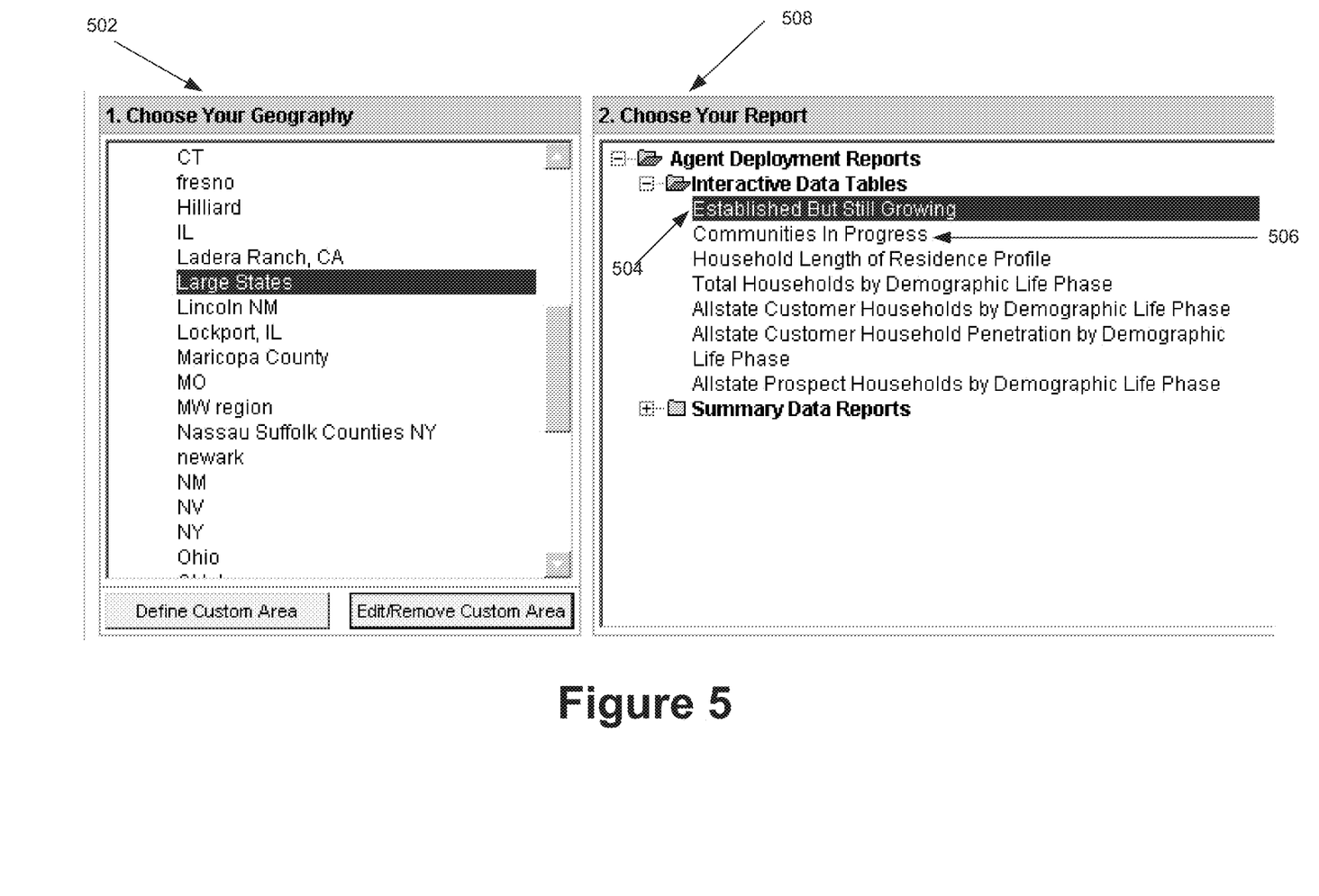
FIG. 5 illustrates the selection of a predefined template, in accordance with an aspect of the invention.

A user may create a customized geographic region for ease of use in future sessions. For example, a user may select California, Florida, Illinois, New York, Ohio, and Texas using the add button 404 and define these selected States (405) as the "Large States" 406. Similarly, a user may edit their customized selection through the use of the remove button 407. A user may save their customized selection using the "Save Changes" button 408. Once saved, a user may select their customized selection during future modeling session as illustrated in FIG. 5 in the "Choose Your Geography" selection screen 502.

Based on the user selected geographic regions, the underlying or related zip codes for selected geographic regions are determined in step 204. The use of zip codes enables all of the collected data from various data sources to be converted into data that may be used and scored on a common metric scale. The common metric scale allows various information sources to be integrated and scored. Those skilled in the art will realize that distinguishable data other than zip codes may be used in order to allow processing of data on a common metric scale.

Next, in step 206, data is received from the user which includes at least one modeling factor to be utilized in the determination of the insurance agency location. Those skilled in the art will realize that any number or combination of modeling factors may be used depending upon the marketing or agency growth strategy.

The modeling factors may include one of the following exemplary factors: 1) households with 2+ vehicles current year estimate; 2) households with 2+ vehicles five year projection; 3) net change vehicle households in five years; 4) owner occupied dwellings current year estimate; 5) owner occupied dwellings five year projection; 6) net change in owner occupied dwellings in five years; 7) total households current year estimate; 8) total household five year project; 9) net change (number and %) in households in five years; 10) new movers; 11) new homeowners; 12) average household net worth; 13) average household income; 14) population 25+ years old; 15) population 25+ with some college education; 16) population 25+ with associate degree; 17) population 25+ with bachelor's degree; 18) population 25+ with graduate or professional degree; 19) percent population 25+ any college education; 20) households with length of residence less than one year; 21) percent households with length of residence less than one year; 22) active property insurance casualty policies; 23) active life/financial insurance policies; 24) active insurance policies; 25) total insurance customer households; 26) total insurance customer household lifetime value; 27) average insurance customer household lifetime value; 28) value of expansion opportunity; and 29) new businesses.

As those skilled in the art will realize, the above modeling factors and/or combinations of modeling factors do not represent an exhaustive list of modeling factors that may used in the determination of agency locations. As an alternative, to the individual selection of each of the modeling factors, templates may be defined with particular modeling factors to be used in the agency location model. For example, templates such as "Established but Still Growing" template 504 in FIG. 5, and a "Communities in Progress" template 506 may be selected from a group of preexisting templates. Each template may contain modeling factors that have been proven to be statistically important when trying to identify particular growth opportunities such as finding markets that have existing neighborhoods that are still growing. The following factors may be preselected to be used with the "Established but Still Growing" template 504: 1) net change (number and %) in households in five years; 2) percent population 25+ years old with any college education; 3) percent households with length of residence less than one year; 4) total insurance customer households; and 5) average insurance customer household lifetime value. Average insurance customer household lifetime value may be calculated by subtracting projected expenses for a customer from projected revenue for each calendar year over a time span of a projected retention period. These values may then be averaged to compute the average insurance customer lifetime value. These are calculated and accessible for use in the model via research network 108.

In another example, the "Communities in Progress" template 506 may identify growth opportunities in generally smaller communities experiencing recent change. Modeling factors that may be utilized when the "Communities in Progress" template 506 is used may include: 1) new movers; 2) new homeowners; 3) percent households with length of residence less than one year; and 4) new businesses.

In step 208, a final score per zip code may be calculated. The calculation of the scores may be determined by the following equations:

$$\frac{\text{Variable 1 information} - \text{Variable 1 } \mu}{\text{Variable 1}\sigma} = \text{Variable 1 score} \quad \text{Equation 1}$$

$$\begin{aligned}(\text{Variable 1 score} * \text{Variable 1 weight}) + \\ (\text{Variable 2 score} * \text{Variable 2 weight}) + \\ (\text{Variable 3 score} * \text{Variable 3 weight}) + \\ \text{other Variables} = \text{Composite score}\end{aligned} \quad \text{Equation 2}$$

$$\frac{\text{Composite Score} - \mu}{\sigma} = \text{Final Score} \quad \text{Equation 3}$$

Figure 6A:
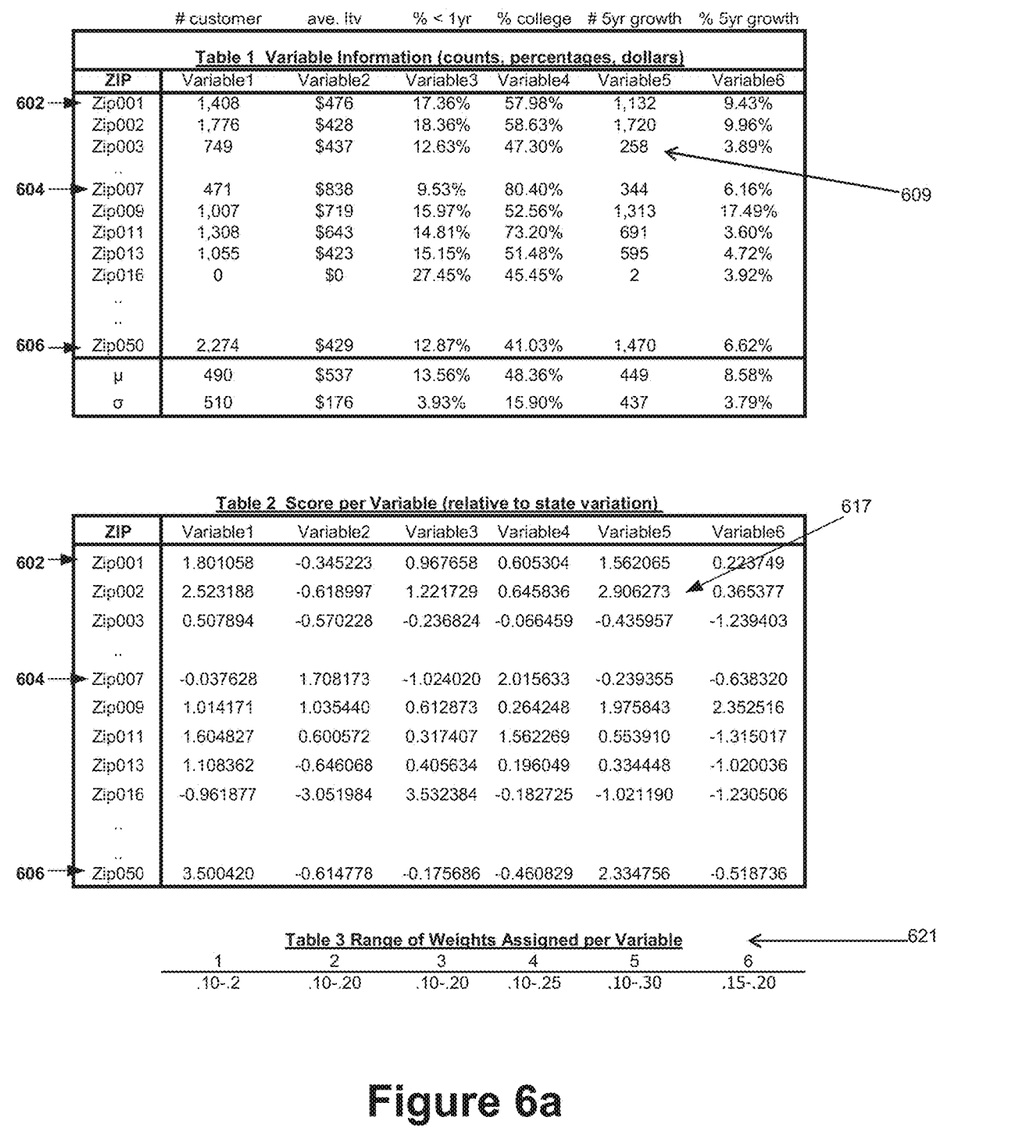
Figure 7:
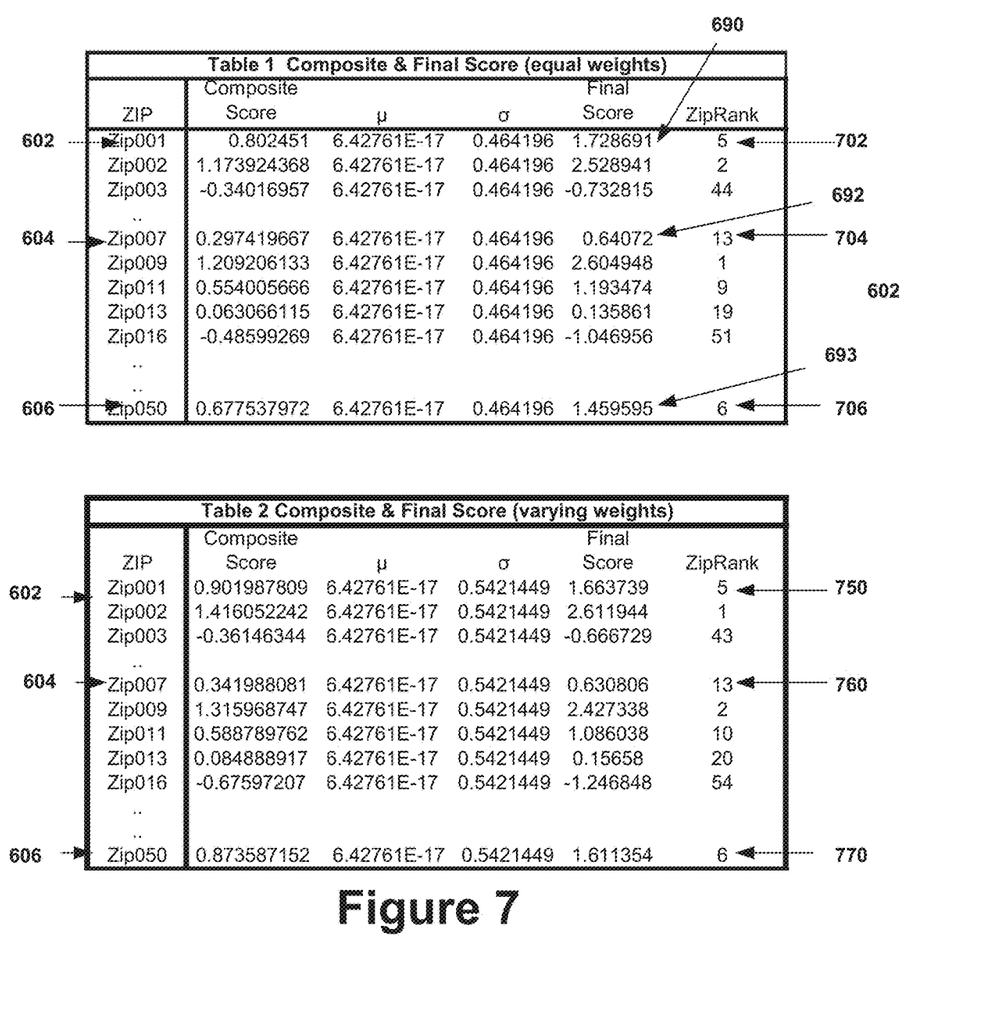

In equations 1 and 3, $\mu$ represents the mean and $\sigma$ represents standard deviation of the individual variables and variable scores multiplied by their variable weights. A positive score reflects greater potential for future business growth in the particular geographic region of interest. A negative score reflects less opportunity for future growth relative to the variation within each geographic region. For example, FIGS. 6a, 6b, and 7 illustrate the calculation of a final score for zip codes in a state, "zips 001 to 003" 602, "zips007, 009, 011, 013, and 016" 604, and "zip050" 606. Each of the zip codes represents a geographic region selected by the user for evaluation. In FIG. 6a, six variables are modeled to identify growth opportunities for placement of insurance agency locations. Variable information 609 for each of the zip codes listed 602, 604, and 606 is shown in Table 1 of FIG. 6a. The variable information includes counts, dollars, and percentage information for the six modeling factors.

A score per variable 617 using equation 1 is calculated for each of the zip codes listed 602, 604, and 606 as shown in Table 2 of FIG. 6a. Table 3 illustrates that a range of weighting factors 621 may be applied to each of the variables. Those skilled in the art will realize that different ranges of weighting factors may be used for each of the modeling factors and that the weighting factors may change over time and with use of model. The weighting factors may be adjusted so that a particular modeling factor is given more significance in the calculation of the final score. In the examples of FIG. 6b, each variable can be assigned equal or varying weights. Table 4, using equation 2, illustrates zip codes 602, 604, and 606 with equal weights. The calculated composite score for "zip 001" 602 is 0.802451 (616), "zip007" 604 is 0.297420 (618), and "zip050" 606 is 0.677538 (620). Table 5 illustrates these same zip codes 602, 604, and 606 with varying weights. Table 5 lists the calculated composite score for "zip 001" 602 is 0.90198781 (680), "zip 007" 604 is 0.34198808 (682), and "zip 050" 606 is 0.87358715 (684).

Next, equation 3 is applied to each of zip codes 602, 604, and 606 as illustrated in Tables 1 and 2 of FIG. 7. For example Table 1 of FIG. 7, calculates the Final Score using equal weights for "zip001" 602 is 1.728691 (690), "zip007" 604 is 0.64072 (692), and "zip050" 606 is 1.459595 (693). Table 2 illustrates the calculated Final Score using varying weights for zips 602, 604, 606. FIG. 7 zip code examples are based upon actual information for the state of Delaware. The positive scores reflect greater potential for future business growth in the particular geographic region of interest;

whereas, the negative scores reflect less opportunity for future growth relative to the variation within each geographic region. Finally, the zip codes are ranked and compared in step 210 according to their value 702, 706, and 704 (uses equal weights); 750, 770, and 760 (uses varying weights).

Figure 8:
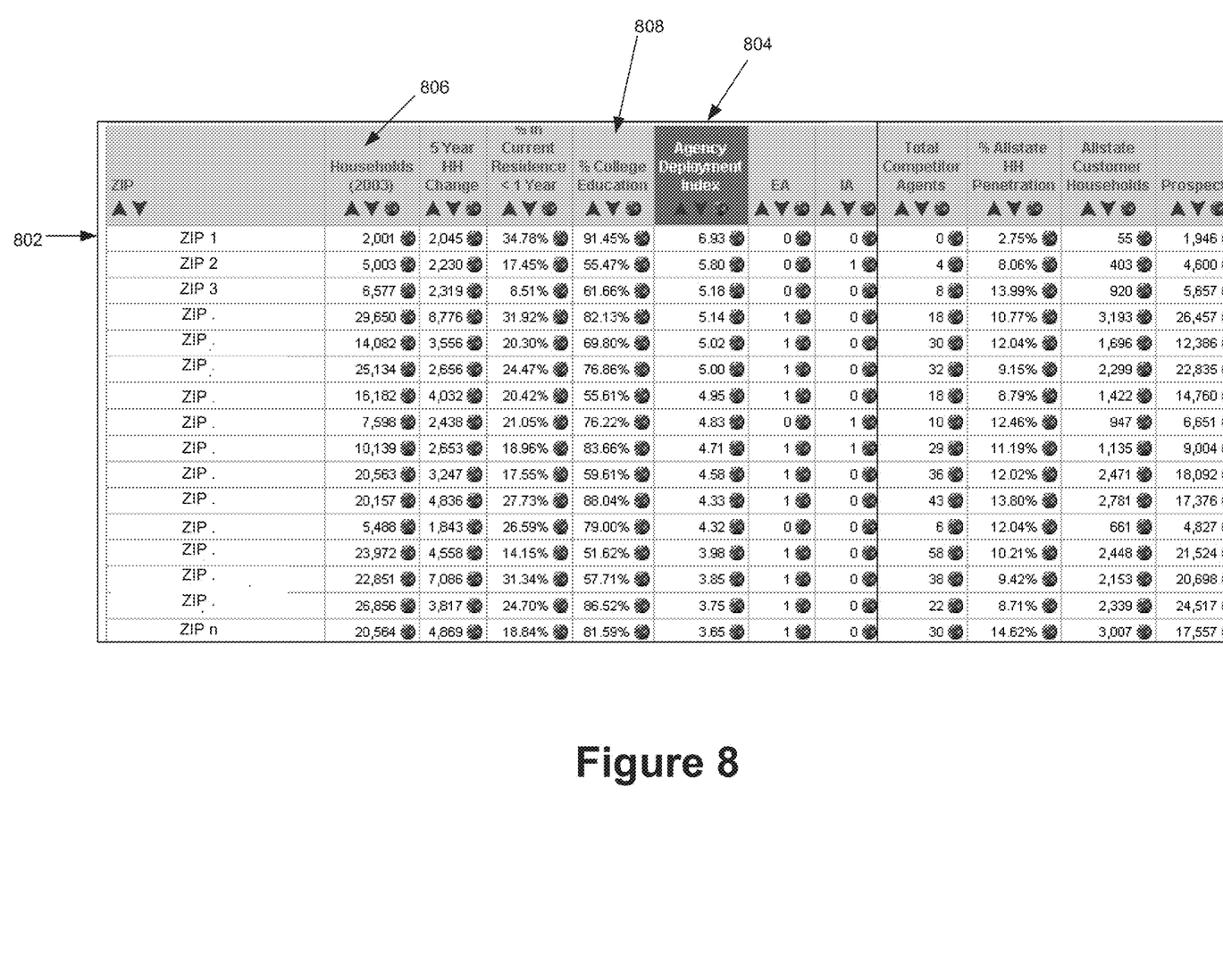
FIG. 8 illustrates the display of the final score along with additional profile information associated with the particular zip code, in accordance with an aspect of the invention.

The final scores for each zip code may be displayed along with additional profile information which may be of interest to the user. For example, the final scores may be integrated with profile information to create new perspectives and insights regarding each market. An example of such profile information is illustrated in FIG. 8. In FIG. 8, a zip code "802" along with its associated Final Score of 6.93 (804) is shown with profile information such as number of households in 2003 (806) and percentage of college education (808). Other profile information that may be displayed includes recent change information, projected growth number, percent current insurance penetration, number of prospects, current number and type of insurance agencies, and number of competitor insurance agencies. Profile information is periodically updated (annually, bi-annually, quarterly, or biweekly).

Figure 9:
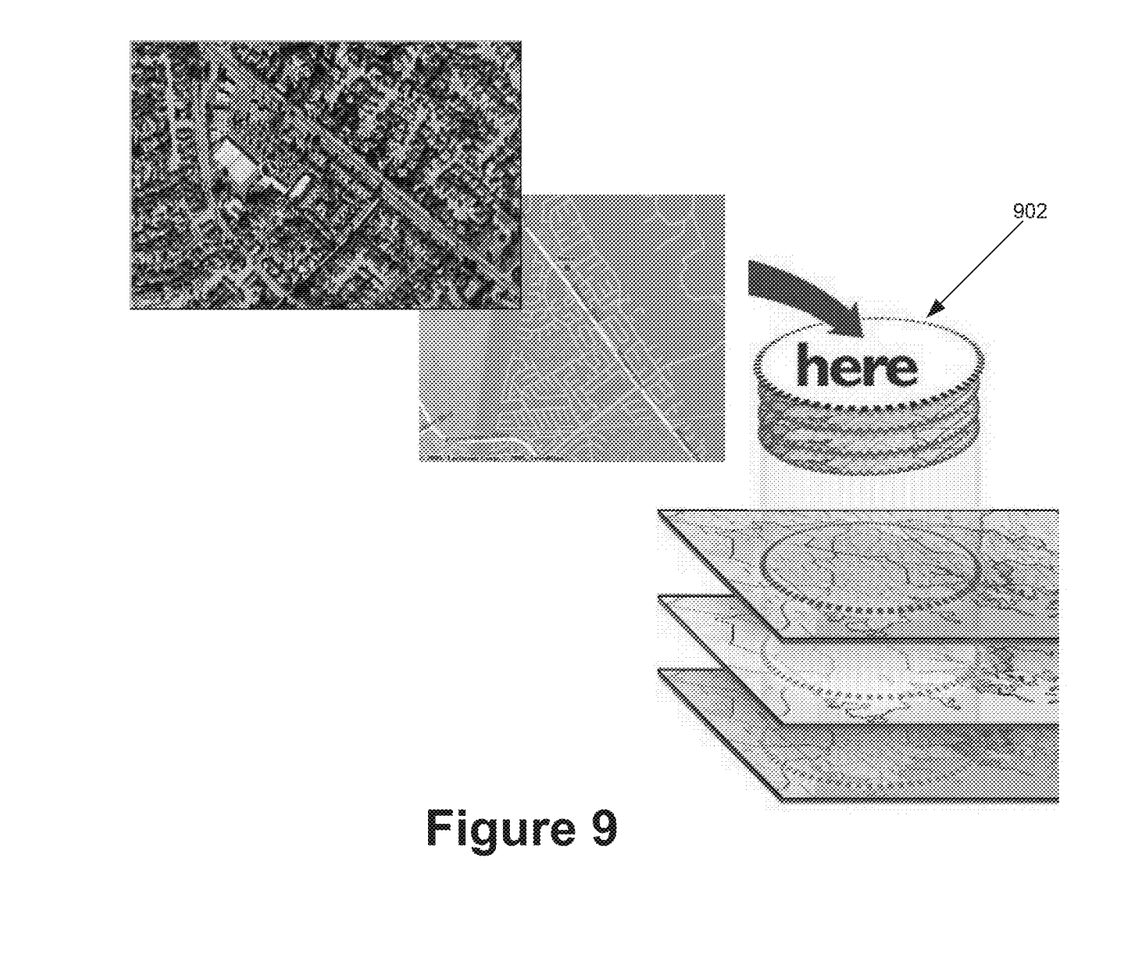
FIG. 9 illustrates a map in which a particular zip code may be viewed by a user, in accordance with an aspect of the invention

Any of the selected zip codes may be displayed on a map such that specific point locations and surrounding areas may be interactively defined with respective model outputs and information generated for surrounding areas. For example, FIG. 9 illustrates a map in which a particular zip code is illustrated by the region defined at 902. In addition, user defined map features may display information such as model outputs, competitor agency locations, and other useful information. The maps may also contain three-dimensional aerial imagery and other geographic features (cartography) which may be displayed to the user. The integration of the results of the final scores along with additional information such as competitor agency locations and cartography may enable a user to pinpoint a highly suitable potential location for the new agency in a particular neighborhood at a particular street address. In addition, reports may be generated detailing the scores for each of the selected zip codes or geographic regions along with detailed maps of each of these potential new agency locations.

A few examples of a few embodiments of the invention are provided below. These examples describe only versions of a few embodiments of the invention. The invention is not limited to the examples described below and includes numerous additional embodiments and versions. The examples should not be read to limit the disclosure of the invention in this application.

EXAMPLE 1

An insurance location is determined through steps of (1) receiving from a user at least one geographic region to be evaluated for placement of the insurance agency location, (2) based on the at least one geographic region received in step (1), determining related zip codes to be evaluated, (3) receiving from the user at least one modeling factor to be utilized in the determination of the insurance agency location, (4) calculating at a processor a final score for each of the zip codes determined in step (2); and (5) comparing the final scores for each of the zip codes to determine the zip code with the highest final score The receiving, determining, calculating and comparing can be performed by a computer. They also can be performed by a person. In addition, the modeling factors that can be used include one or more of the following: total and net change in households in current year and last five years; number of new homeowners and new movers; percentage of population with at least twenty five years of age and some college education; percentage of households with length of residency of less than one year; total number of agency customer households; total number of new businesses; agency customer household lifetime value; whether or not household maintains 2 or more vehicles; whether a dwelling is owner occupied; average household income and average household net worth.

EXAMPLE 2

The location for an insurance agency is determined using at least the following steps. A geographic region to be evaluated for placement of the insurance agency location is received from a user. Based on this geographic region, particular zip codes are identified to be evaluated. A composite score is calculated for each zip code. A final score is then calculated at a processor for each of the zip codes using the formula $$\frac{\text{Composite Score} - \mu}{\sigma} = \text{Final Score}.$$

The final scores are compared to each other to determine the relative ranking. The final scores may be displayed on a map and/or summarized and detailed in a report.

EXAMPLE 3

A computer-readable medium contains computer-executable instructions for causing a computer device to perform a number of steps. These steps include (a) receiving from a user zip codes to be evaluated for placement of an insurance agency location; (b) receiving from research terminal 102, 104 modeling factors to be utilized in the determination of the insurance agency location; (c) calculating at a processor a final score for each of the zip codes received in step (a); (d) comparing the final scores for each of the zip codes to determine the zip code with the highest final score; and (e) displaying the final scores for each of the zip codes on a map and/or report that contains at least street level information.

While the invention has been described with respect to specific examples including presently preferred modes of carrying out the invention, those skilled in the art will appreciate that there are numerous variations and permutations of the above described systems and techniques that fall within the spirit and scope of the invention.

We claim:

1. A method of determining an insurance agency location, the method comprising:
   providing a graphical user interface generated by a data solutions transaction manager, the graphical user interface including one or more analysis tools;
   launching an agency deployment tool in response to a selection from the one or more analysis tools;
   prompting an identification of a geographic region using the agency deployment tool, the geographic region identified using the graphical user interface;
   determining a plurality of zip codes corresponding to the geographic region using the agency deployment tool;
   obtaining customer data, the customer data including current customer data and potential customer data;
   calculating a score for each zip code of the plurality of zip codes using the agency deployment tool, wherein calculating the score comprises:

determining a value of a demographic information variable for a respective zip code;

determining a mean and a standard deviation for the demographic information variable based on demographic information, the demographic information obtained from the customer data and corresponding to the geographic region; and calculating the score using the value, the mean, and the standard deviation of the demographic information variable;

identifying and displaying, via the graphical user interface, a zip code having a highest score of the scores for the plurality of zip codes; and identifying and displaying, via the graphical user interface, a zip code having a second-highest score of the scores for the plurality of zip codes.

2. The method of claim 1, wherein the zip code having the highest score and the highest score are identified on a map comprising the plurality of zip codes.

3. The method of claim 1, wherein calculating, by the server, the score for each of the plurality of zip codes further comprises:

calculating, by the server, a composite score for each of the plurality of zip codes; and calculating, by the server, a final score for each of the plurality of zip codes equal to a difference of the composite score for the zip code and a mean composite score of the plurality of zip codes, divided by a standard deviation of the composite score of the plurality of zip codes.

4. The method of claim 3, wherein the composite score comprises a weighted composite score.

5. The method of claim 1, wherein the demographic information variable indicates one of a total and a net change in a number of households in a current year or a last five years in the respective zip code.

6. The method of claim 1, wherein the demographic information variable indicates a number of new homeowners and new movers in the respective zip code.

7. The method of claim 1, wherein the demographic information variable indicates a percentage of a population aged at least twenty-five years with some college education in the respective zip code.

8. The method of claim 1, wherein the demographic information variable indicates a percentage of households with a length of residency of less than one year in the respective zip code.

9. The method of claim 1, wherein the demographic information variable indicates a total number of agency customer households in the respective zip code.

10. The method of claim 1, wherein the demographic information variable indicates a total number of new businesses.

11. The method of claim 1, wherein the demographic information variable indicates an agency customer household life time value, the agency customer household life time value being projected revenue minus projected expenses for a customer household in the respective zip code.

12. The method of claim 1, wherein the demographic information variable indicates a number of households with two or more vehicles in the respective zip code.

13. The method of claim 1, wherein the demographic information variable indicates a number of owner-occupied dwellings in the respective zip code.

14. The method of claim 1, wherein the demographic information variable indicates one of an average household income and an average household net worth in the respective zip code.

15. A method of determining a business location, the method comprising:

generating a graphical user interface based on a business location placement evaluation request, the graphical user interface generated by a data solutions transaction manager;

identifying a geographic region corresponding to the business location placement evaluation request using the data solutions transaction manager, the geographic region identified based on user input captured with the graphical user interface;

determining a plurality of geographic sub-regions located within the geographic region;

obtaining customer data, the customer data including current customer data and potential customer data;

receiving a plurality of demographic factors, the plurality of demographic factors indicated using the graphical user interface;

calculating a projected growth composite score for each of the plurality of geographic sub-regions, the projected growth composite score calculated using the data solutions transaction manager based on the customer data corresponding to the plurality of demographic factors;

calculating a final score for each of the plurality of geographic sub-regions using the data solutions transaction manager, the final score calculated based on the projected growth composite score for the respective geographic sub-region;

identifying a geographic sub-region having a highest final score of the final scores for the plurality of geographic sub-regions; and identifying a geographic sub-region having a second-highest final score of the final scores for the plurality of geographic sub-regions, the geographic sub-region having the highest final score and the geographic sub-region having the second-highest final score displayed using the graphical user interface.

16. The method of claim 15, wherein the geographic sub-region having the highest final score and the highest final score are identified on a map comprising the plurality of geographic subregions.

17. A method of determining an insurance agency location, the method comprising:

generating a graphical user interface based on an insurance agency location determination request, the graphical user interface generated by an agency deployment tool of a data solutions transaction manager;

obtaining a template comprising one or more modeling factors corresponding to the insurance agency location determination request;

receiving a geographical region corresponding to the insurance agency location determination request, the geographic region identified based on user input captured by the graphical user interface;

determining zip codes associated with the received geographical region using the agency deployment tool;

transmitting a request to an information vendor for data associated with the determined zip codes;

receiving the data associated with the determined zip codes from the information vendor;

calculating a final score for each of the determined zip codes using the agency deployment tool, the final score for each of the determined zip codes calculated using the data associated with the zip codes and the one or more modeling factors; and displaying a ranking of the final scores for each of the zip codes using the graphical user interface.

18. The method of claim 17, wherein calculating, by the server, the final score for each of the determined zip codes further comprises:

calculating, by the server, a plurality of variable scores for each of the determined zip codes;

calculating, by the server, a composite score for each of the determined zip codes based on the plurality of variable scores for the respective zip code; and calculating, by the server, the final score for each respective zip code, wherein the final score is equal to a difference of the composite score for the respective zip code and a mean composite score of the determined zip codes, divided by a standard deviation of the composite score of the determined zip codes.

19. The method of claim 18, wherein the composite score comprises a weighted composite score.

20. The method of claim 15, wherein receiving, by the server, the user input representing the geographic region to be evaluated for placement of the business location comprises:

retrieving one or more saved selections from a persistent memory accessible by the server, wherein each of the one or more saved selections comprises at least one geographic region; and receiving user input indicating a selection of one of the one or more saved selections.

* * * * *